July 6, 1943.  J. W. BRYCE  2,323,372
FILM DATA SELECTING AND VIEWING MACHINE
Filed June 27, 1940   8 Sheets-Sheet 1

INVENTOR.
James W. Bryce
BY
Cooper, Kerr & Dunham
ATTORNEYS

July 6, 1943.                J. W. BRYCE                2,323,372
                   FILM DATA SELECTING AND VIEWING MACHINE
            Filed June 27, 1940              8 Sheets-Sheet 3

INVENTOR.
James W. Bryce
BY
Cooper, Kerr & Dunham
ATTORNEYS

July 6, 1943.  J. W. BRYCE  2,323,372
FILM DATA SELECTING AND VIEWING MACHINE
Filed June 27, 1940  8 Sheets-Sheet 5

FIG.5.

INVENTOR.
James W. Bryce
BY Cooper, Kerr & Dunham
ATTORNEYS

July 6, 1943.  J. W. BRYCE  2,323,372
FILM DATA SELECTING AND VIEWING MACHINE
Filed June 27, 1940  8 Sheets-Sheet 6

FIG.6.

INVENTOR.
James W. Bryce
BY Cooper, Kerr & Dunham
ATTORNEYS

July 6, 1943.　　　J. W. BRYCE　　　2,323,372
FILM DATA SELECTING AND VIEWING MACHINE
Filed June 27, 1940　　　8 Sheets-Sheet 7

Patented July 6, 1943

2,323,372

UNITED STATES PATENT OFFICE 2,323,372

FILM DATA SELECTING AND VIEWING MACHINE

James W. Bryce, Glen Ridge, N. J., assignor to International Business Machines Corporation, New York, N. Y., a corporation of New York Application June 27, 1940, Serial No. 342,641

12 Claims. (Cl. 88—24)

This invention relates to a film data selecting and viewing machine.

The present invention has for its principal object the provision of a machine which enables film data to be automatically selected for viewing from a film in which data may be disposed in sections of indeterminate length upon the film as distinguished from data disposed in equisized frames.

A further object of the present invention resides in the provision of a film selecting and viewing machine in which a film section may be automatically selected for viewing either by automatically stopping the film at the beginning of a selected group of data or at the end of such group of data.

A further object of the present invention resides in the provision of a film viewing and selecting machine in which there is an automatic disconnection of the power drive for film feed upon selected data being scanned with the further feature of the provision of a manual means for advancing or retracting the film to permit the operator to select the particular zone or section of the film to be viewed.

A further object of the present invention resides in the provision of an improved film selecting and viewing machine in which there is a common station for scanning the film to selectively stop film feed and for viewing the film after it is stopped. Suitable mirror means are provided to alternatively allow data derived from the film to influence photo-cells or to direct film data to a viewing screen. In this respect the present invention is an improvement in the construction shown in my previous Patent No. 2,124,906, where there is a separate scanning and viewing station.

A further object of the present invention resides in the provision of a film selecting and viewing machine in which provision is made for stopping film feed at the beginning of each group of data on the film irrespective of the group number or a change or lack of change in the group number marks on the film. A like control is provided for stopping film feed at the end of each group.

A further object of the present invention resides in a film controlled machine having photocells and reflecting means so disposed as to minimize the space occupied by the group of cells.

Further and other objects of the present invention will be hereinafter set forth in the accompanying specification and claims and shown in the drawings which show by way of illustration a preferred embodiment and the principle thereof and what I now consider to be the best mode in which I have contemplated appling the principle. Other embodiments of the invention employing the same or equivalent principle may be used and structural changes made as desired by those skilled in the art without departing from the present invention and within the spirit of the appended claims.

General operation

In my copending application Serial No. 336,934, filed May 24, 1940, there is disclosed a machine for making statistical records on film. These records may comprise listed items and totals of such items or just totals alone. Generally such items are allocated into groups of varying lengths. For identifying purposes each group has a so-called group number. As disclosed in the above application I have provided means for making a film record having code spots horizontally disposed above each group so that selection of these groups may be made in a novel and convenient manner. It is the purpose of the present invention to provide a machine for making such a selection of portions of the film to be viewed and to provide for viewing such selected section of film.

According to the present invention, a machine is provided which feeds a length of film bearing data and code and control spots past devices which project the code and control spot data upon a bank of photo-cells. Film feed is continuous. By means of a hand set device which is pre-set to a particular group number, certain machine circuits are pre-conditioned so that only certain selected photo-cells of the photo-cell bank are effective. Thus, when a portion of film bearing the desired list passes the projection device, the code spots representing the set up group control number actuate the pre-conditioned circuits by means of their corresponding photo-cells. The machine then terminates film feed through certain control circuits.

The portion of selected film is now automatically projected upon a ground glass screen for viewing purposes. If the list is particularly long, so that it may not be entirely upon the viewing screen, a manual control may be operated to move the film forward or backward.

It was further disclosed in the aforementioned application how an auxiliary control spot may be recorded in a line with the code spots and on a line with the total. Before film feeding operations are started, the machine may be pre-set to stop either at the first line of a list under control of the auxiliary spot in line with the code spots or at the total line under control of the auxiliary total control spot.

If it is desired to stop at the first line of every group instead of the first line of a selected group the machine may be pre-set for such an operation or if it is desired to stop at every total line the machine may also be pre-set for such a selection.

Film may be run continuously through the machine with no control at all if so desired.

Figure 2:
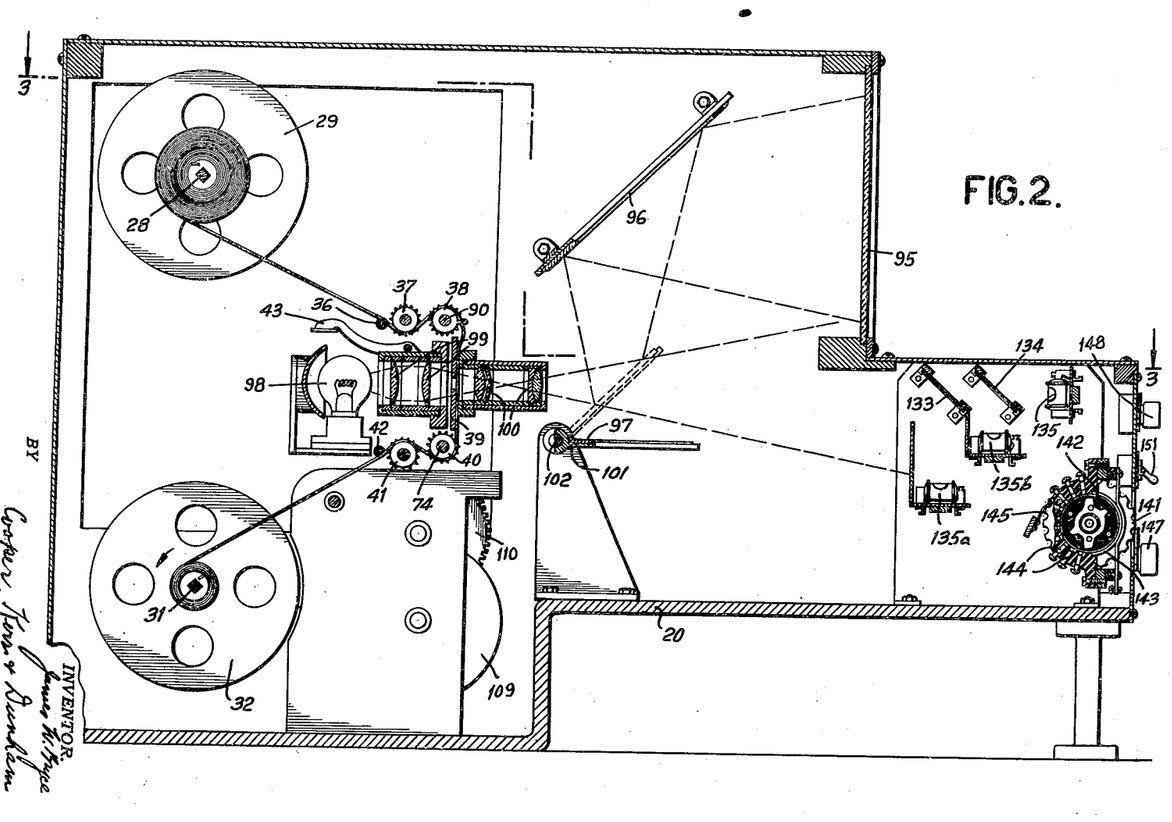
Fig. 2 is a detail sectional view taken on line 2—2 of Fig. 1.
Figure 4:
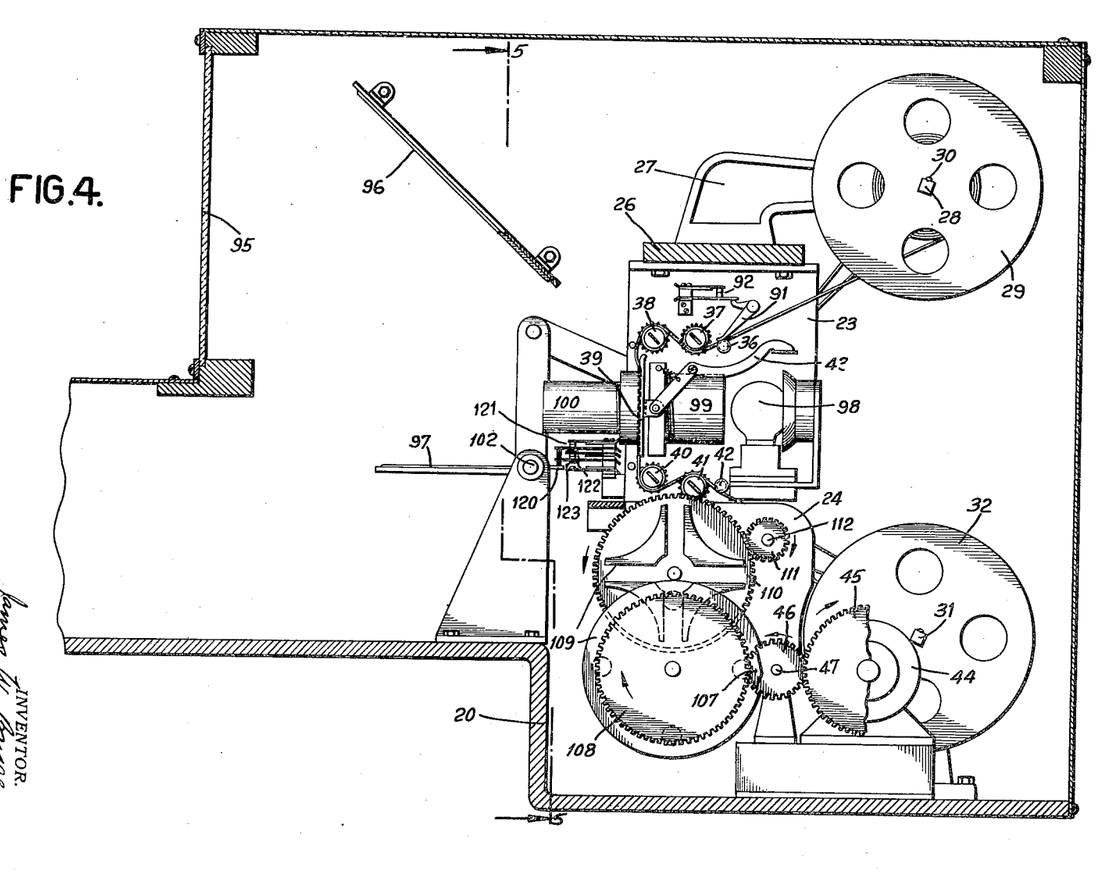
Fig. 4 is a right hand elevational view, inside the covers, the view being taken on line 4—4 of Fig. 3.
Figure 5:
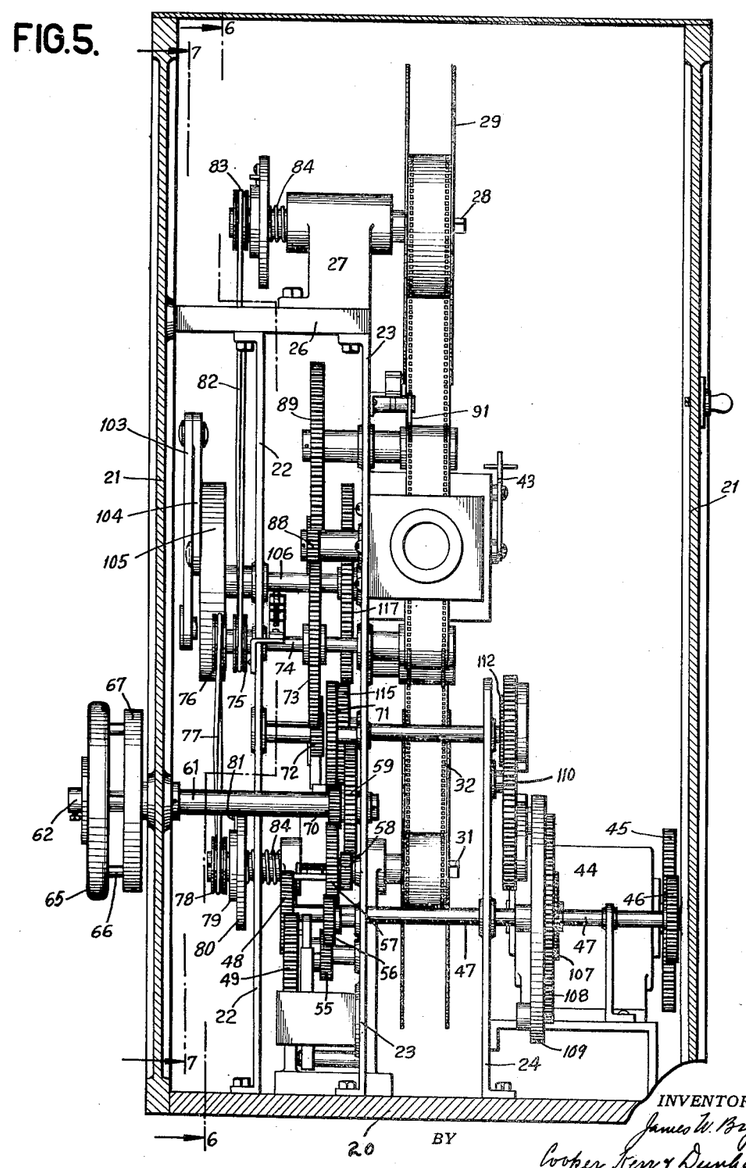
Fig. 5 is a sectional elevational view taken on line 5—5 of Fig. 4.
Figure 6:
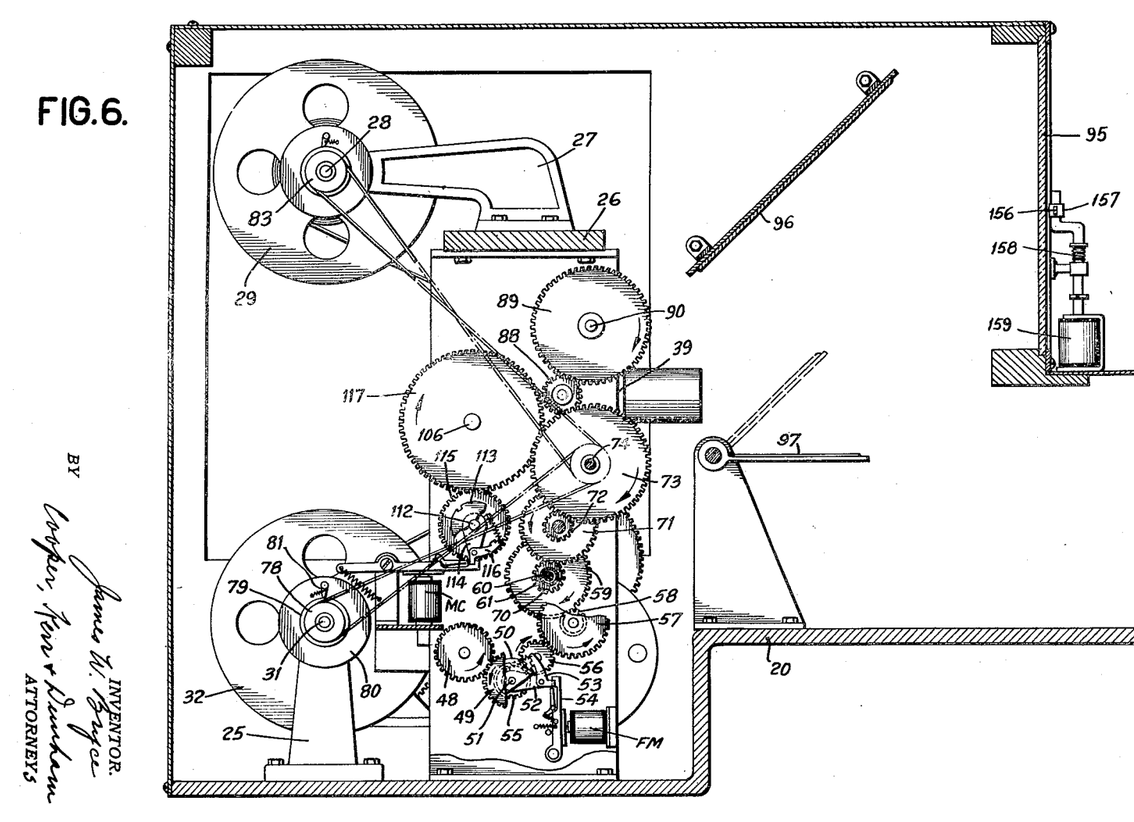
Fig. 6 is a left hand elevational view taken on line 6—6 of Fig. 5.
Figure 7:
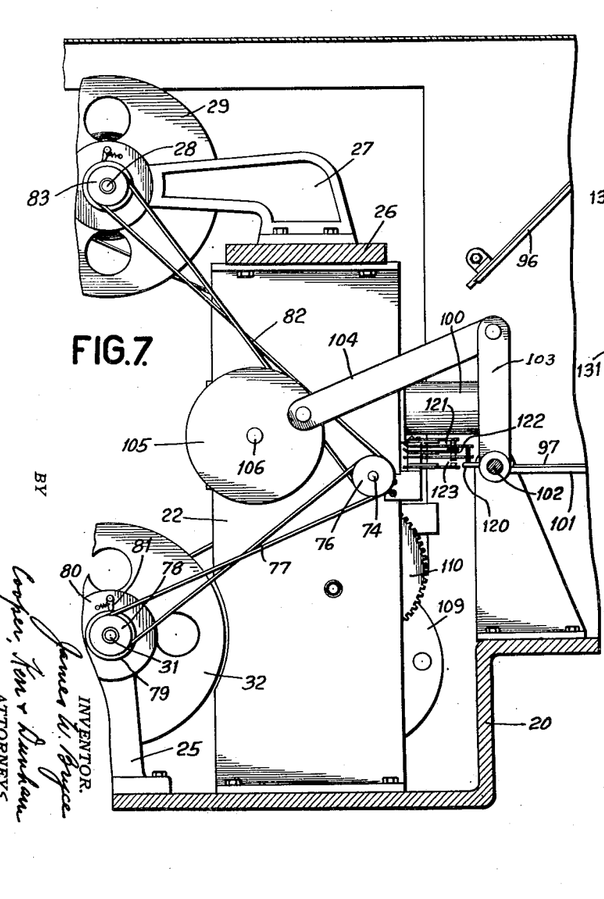
Fig. 7 is a sectional view taken on line 7—7 of Fig. 5.
Figure 8:
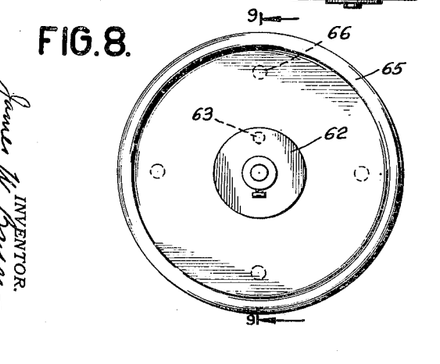
Fig. 8 is a detail view of the manual drive mechanism, the view being taken on line 8—8 of Fig. 1.

In more detail, the machine is provided with a suitable base designated 20 (see Figs. 2, 5 and 6). Suitably supported on this base are outer side frame members 21 (Fig. 5) and intermediate vertical frame members 22, 23 and 24. Also supported on the base is a pedestal member 25 (see Figs. 6 and 7). The intermediate frames 22, 23 (Fig. 5) carry cross-plate 26 which has secured to it a cantilever bracket 27. Journalled in this bracket is a shaft 28. One end of this shaft is squared to fit a squared opening in a film supply reel 29 (Fig. 4). It may be mentioned that at times the supply reel has to be rotated for re-winding the film on the supply wheel. At such times the squared end of the shaft provides a driving connection between the shaft and reel. The reel is retained in any desired manner on the squared end of the shaft as by means of a spring pressed pawl 30. Referring to Fig. 6, the pedestal 25 has journalled therein a shaft 31. This shaft also has a squared end to drive a take-up reel 32 (see Fig. 4).

Before describing the manner in which the film is driven, the path of the film, through the machine, will be traced. Referring to Figs. 2 and 4, the film leading from reel 28 passes over a guide rod 36, thence under an idler sprocket 37, over a drive sprocket 38, through a gate 39, under a feed sprocket 40, over an idler sprocket 41, under a guide rod or pillar 42 and thence to the take-up reel 32.

A customary film loop is provided as indicated in Fig. 2. To facilitate threading of the film, the gate 39 may be opened by manually rocking a spring pressed lever 43 in a counterclockwise direction as viewed in Fig. 4.

Figure 3:
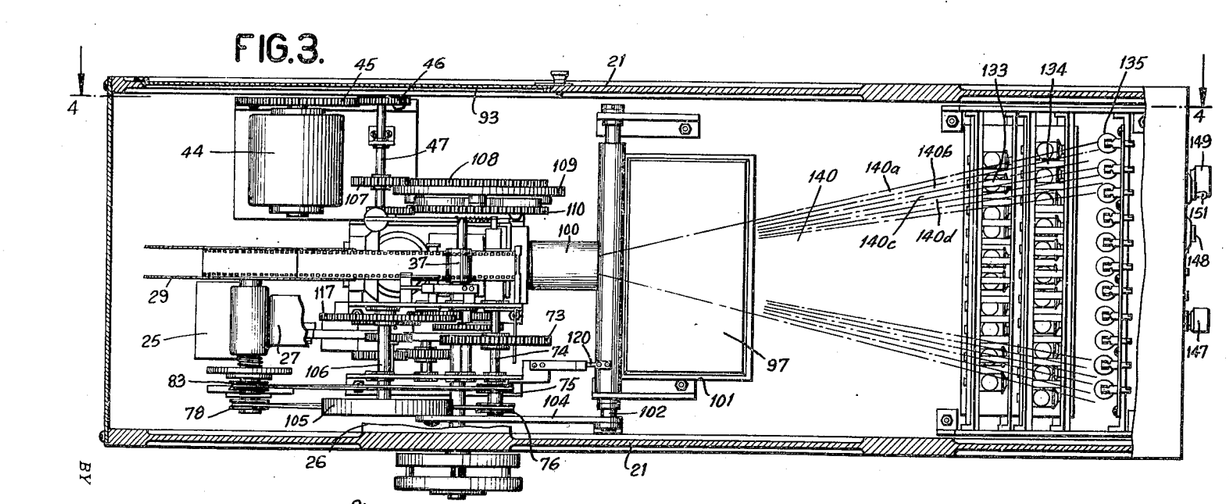
Fig. 3 is a sectional view taken on line 3—3 of Fig. 2.

The drive for the feed sprockets 38 and 40 will now be described. Referring to Fig. 3 there is provided a driving motor 44 which, through gears 45 and 46, rotates a shaft 47. This shaft 47 (see also Fig. 5) extends through the various vertical supporting frame plates and its opposite end is provided with a gear 48. This gear 48 (see Fig. 6) drives a gear 49 which has fixed to it the notched driving element 50 of a one-revolution clutch. Gear 49 and the element 50 are freely rotatable upon a supporting shaft 51. Also freely rotatable on shaft 51 is an arm 52 carrying a driving dog 53 which is normally latched out of engagement with the driving element 50 by the armature latch 54 of a film feed magnet FM. The clutch arm 52 is in turn secured to a gear 55 which, through a train of gears 56, 57 and 58, drives a gear 59.

Figure 9:
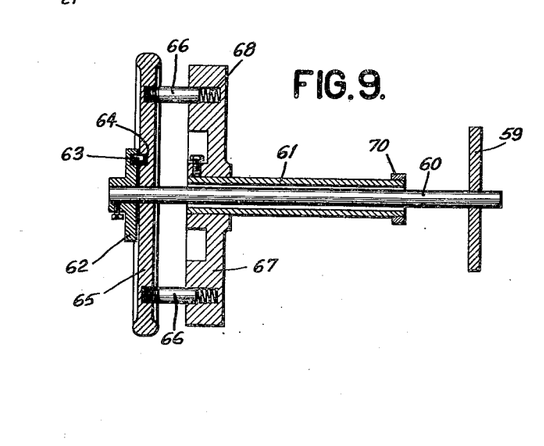
Fig. 9 is a detail sectional view taken on line 9—9 of Fig. 8.

Referring to Fig. 9, gear 59 is fast to a shaft 60 which extends through a hollow shaft 61. Shaft 60 in turn at its outer end has fast to it a collar-like member 62. Extending inwardly from the collar member 62 is a pin 63 which is adapted to engage in a recess 64 in a hand wheel 65. The hand wheel 65 in turn is provided with a plurality of pins 66 which extend into sockets in an annular member 67, which in turn is fast to the hollow shaft 61. Suitable springs 68 are disposed in the sockets in member 67. With the parts in the relation shown in Fig. 9, it will be appreciated that rotation of gear 59 will impart rotation to the hollow shaft 61. However, if the hand wheel 65 is pressed inwardly, the pin 63 will become disengaged from the recess or socket 64 in member 65 and under this condition there is a disconnection of the drive from shaft 60 to hollow shaft 61 and the hollow shaft 61 may then be rotated manually by rotating the hand wheel 65. Fast on the end of hollow shaft 61 is a driving gear 70. Such gear 70 (see Fig. 6), through gearing 71, 72, drives a gear 73 which is in turn fixed to a shaft 74. Fixed to shaft 74 are a pair of pulleys 75 and 76 (see Figs. 5 and 6). Cooperating with pulley 76 is a belt 77 which is crossed and which in turn drives a pulley 78 freely rotatable on shaft 31. Pulley 78 (see Figs. 5 and 6) has fast to it a disk 79 which is also freely rotatable on the takeup shaft 31. Fast to the takeup shaft is another disk 80 provided with a pawl 81 engaging the periphery of disk 79 (see also Fig. 7).

The above parts provide for drive of the takeup shaft positively in a counterclockwise direction (see Fig. 2) and provide for reverse rotation of reel 32. In order to drive the upper reel 29 a cross belt 82 (Fig. 6) is provided which cooperates with a pulley 83. A generally similar one-way driving connection is provided between pulley 83 and shaft 28 which provides for the drive of reel 29.

In the usual operation of the machine the film is reeled off the upper wheel and wound upon the lower reel, but at times, particularly when there is manual drive, the film may be wound up on the upper reel and reeled off from the lower wheel. In order to prevent overrunning of the wheels, compression springs 84 are provided (see Fig. 5). Shaft 74 previously referred to has fast to it the drive sprocket 40 (Fig. 2). Gear 73 (Fig. 6), through idler gear 88 drives a gear 89 fixed to a drive shaft 90 which in turn has fast to it the upper feed sprocket 38 (see Fig. 2).

From the foregoing description it will be understood that with the motor 44 in operation and with the hand wheel 65 and associated parts in the normal position as shown in Fig. 9, energization of the film feed clutch magnet FM (Fig. 6) will provide a drive which will turn shaft 60 in a clockwise direction and drive will be imparted to the film feed sprockets 38 and 40 to feed the film downwardly through the film gate. With such drive the takeup reel 32 will also be rotated to wind up the film upon the lower reel. Accordingly, as long as the clutch magnet FM remains energized, the film will be fed from the upper supply reel to the lower takeup reel.

To provide for certain controlling operations when the film is exhausted, a film lever 91 is provided (see Fig. 4). With the film running film lever 91 maintains contacts 92 closed and when the film is exhausted the slight rocking of film lever 91 in a counterclockwise direction permits the contacts 92 to open.

Loading and re-loading of the machine may be effected through a suitable door 93 (see Fig. 3).

*Manual film drive*

When it is desired to feed the film manually past the gate, the hand wheel 65 is pressed inwardly in a manner previously explained. After this has been done the hand wheel may be rotated manually in either direction to cause the film to be wound up on the lower reel and unwound from the upper reel or to be wound up on the upper reel and unwound from the lower reel. Thus the film may be advanced past the gate to any desired extent in either direction by hand.

As is customary in machines employing film, the reels may be reversed when it is desired to provide rapid re-winding.

*Optical system*

Before describing the details of the optical system, it may be explained that the present machine is intended to sense designating marks upon the film and it is also intended to optically project an image of a section of the film upon a viewing screen. The designations on the film affect photo-cell sensing means and these photo-cell sensing means control which section of the film is to be viewed by the operator of the machine. The photo-sensing control and its details will be subsequently described, but it may be here stated that when the photo-cells detect that a certain section of the film is to be viewed these photo-cells, through intermediate controls bring about displacement of a mirror which deflects an image of the film up to the viewing screen. Furthermore, when a section of the film is to be viewed, film feed is to be terminated. A suitable source of light is provided for both affecting the photo-cells and for providing the image projection upon the viewing screen.

Referring now to Fig. 2, 95 is the ground glass viewing screen. Back of this screen is a reflecting mirror 96. Below the mirror 96 is a displaceable mirror 97. With the displaceable mirror 97 in the upper (dotted line) position, an image of a section of the film may be viewed on the viewing screen 95. In order to trans-illuminate and project an image of the section of the film at the film gate, a suitable light source 98 is provided. There is also provided a condensing lens system 99 and a projecting lens system 100. As stated before, with the displaceable mirror 97 in upper position the section of the film at the film gate may be viewed on the viewing screen 95. On the other hand if the mirror is in the full line position (Fig. 2), the projected image from the film is directed to photo-cell sensing means to be hereinafter described.

Before describing the photo-cell sensing means, the manner of mounting and displacing mirror 97 will be described. The mirror 97 (Fig. 3) is mounted on a frame 101 which is fixed to a shaft 102 (see also Fig. 7). Fast to shaft 102 is a vertically extending arm 103 which in turn connects to a link 104 which link in turn has a pivotal connection with a crank disk 105 fixed to a shaft 106. The drive for the shaft 106 will now be described.

Referring to Fig. 3, the shaft 47 previously referred to, drives a gear 107 which in turn drives a gear 108. Gear 108, through a Geneva drive, generally designated 109 (Fig. 4) drives a gear 110 which in turn drives a gear 111 fast on a shaft 112. Shaft 112 (see Fig. 6) has fast to it the one notch clutch element 113 of a one-revolution clutch. Freely rotatable on shaft 112 is a clutch arm 114 fast to a gear 115 and carrying the customary clutch dog 116. Gear 115 meshes with a gear 117 which in turn drives the shaft 106 (see also Fig 7). To engage the one-revolution clutch a mirror clutch magnet MC is energized. This releases the clutch dog 116 and allows it to engage with the clutch 113 whereupon the one-revolution clutch drives the shaft 106 through one-half revolution. This movement will alternatively raise and lower the mirror 97 which has been previously referred to.

Referring to Figs. 3 and 4 the frame 101 has fast to it a contact operating arm 120. Arm 120 controls three pairs of contacts designated 121, 122 and 123. The upper two contact pairs 121 and 122 are closed with the mirror 97 in lower position and at such time the lower contacts 123 are open. With the mirror in upper position the upper contacts 121 and 122 move under spring action to open position and the lower contacts become closed.

Before explaining the arrangement and disposition of the photo-cells, the film record will be generally explained with reference to Fig. 10. This figure, it may be explained, shows a portion of the film as it would appear if projected upon a screen. The film record comprises a plurality of longitudinally separated bodies of data. Each body of data may be referred to as a group record or as a record section of the film. Each such record section has its own identification in the form of one or more code spots 130 disposed along a line across the film. The position of the spot transversely of the film determines its significance. A code spot may have any one of thirty positions in a transverse line. The first ten positions at the right are those utilized to signify the units denomination value. The next ten are those to signify the tens denomination value and the ten positions at the left are those utilized to signify the hundreds order value. The value designation is merely exemplary. It is possible for instance that a combination of code spots may be utilized to designate the letter of the alphabet. As here shown the uppermost record section in Fig. 10 has code spots designating a group number 762. Following the identifying line of code spots each record section has a line of data which includes the group number at the left. One or more lines of such data exclusive of the group number may follow in a particular section. The last line of the record section is a total line bearing total data which is representative of an accumulation of the numerical data of the preceding lines. Such total line is preferably distinguished by the presence of a supplemental designation in the form of a control spot 131 at the left of the line.

For convenience the width of the film adapted to bear the code spots and characters may be considered as sub-divided into vertical columns. All of the possible positions of the code spots 130 preferably lie in the same columns which are adapted to contain character data. However, the total control spot 131 is in the column to the left of and outside the zone of the columns which may contain code spots or characters.

In order to enable the photo-cell sensing means to differentiate between the line of code spots and the line of characters, a supplemental designation in the form of a control spot 132 accompanies each line of code spots 130. The spot 132 is to the right of and outside of the zone of the columns which may contain code spots or characters. Accordingly, the sensing of a control spot 132 cannot be mistaken for the sensing of a character or code spot. The control spot 132 may be considered as part of the identifying designation of a film section of data and at the same time as controlling means to differentiate the identification spots 130 from the characters. It is possible that the film record may consist merely of record sections made up of codal identification followed by lines of data not ending in a total line. It is possible also that the film record might comprise only a line of code spots followed by a line of total data, followed by another line of code spots and so on. It is further possible that the special spot 131 may be opposite any desired line of data which is to be selected for viewing.

Figure 10:
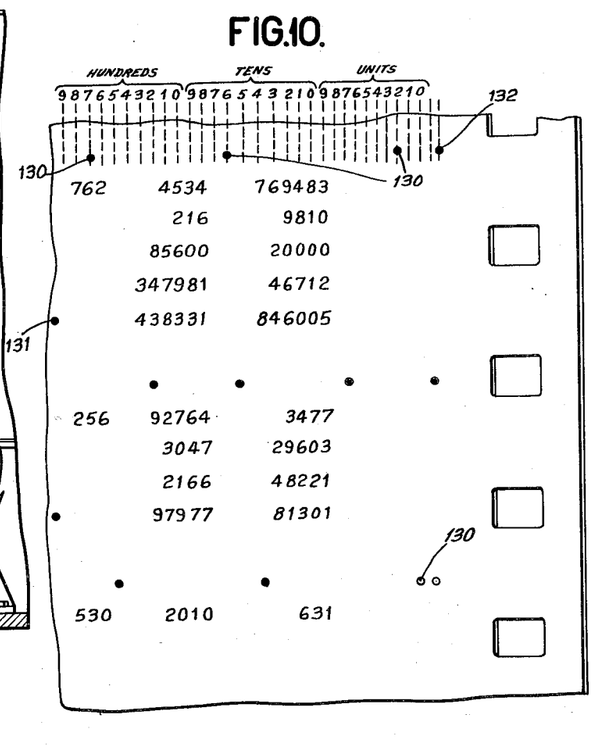
Fig. 10 is an enlarged view of a portion of a record strip such as used in controlling the machine. The view shows the record strip as viewed upon the screen of the machine.

Before further explaining the photo-cell sensing system, it may be mentioned that the film is placed in the machine and threaded through the gate in such a manner that if the film be actually viewed at the gate the film would appear reversed end for end and left to right with respect to the showing of Fig. 10. In other words, if the figure 10 be turned one hundred-and-eighty degrees, this would be the appearance of the film from the gate at the opposite side of the light source. It will now be assumed that the mirror 97 is in the full line position (Fig. 2). With the displaceable mirror 97 in the full line position, a portion of the beam carrying the film image will be projected directly to a series of ten mirrors generally designated 133. Another portion of the beam carrying the film image will be projected directly to a series of eleven mirrors generally designated 134 and the remainder of the beam will be projected directly to certain of the photo-cells which are generally designated 135. While the light beams from all sections of the film could be projected directly to the photo-cells 135 such a projecting arrangement would require a great deal more lateral space in the machine than is desirable in practice. In order to obviate this difficulty, the sets of mirrors 133 and 134 have been provided. The set of mirrors 133 project the light beams which they intercept to photo-cells which may be designated 135a, whereas the mirrors 134 project the light beams which they intercept on to a set of photo-cells 135b. It may be mentioned that there are eleven photo-cells of the 135 set which receive light beams direct from the film. There are eleven photocells 135b in the second set which receive the light beams as deflected by the 134 set of mirrors and there are ten photo-cells of the 135a set which receive light beams as deflected by the 133 set of mirrors.

Referring to Fig. 3, reference character 140 designates the film beam which projects the entire film image across a complete line. Individual beam 140a designates the particular light beam which projects the image representative of the extreme right hand column of the film as viewed in Fig. 10. This would be the beam from the column on the film containing the control spot 132. Beam 140b represents the second column from the right and so on. As shown in Fig. 3, beam 140a projects directly to the uppermost of the 135 set of photo-cells. Beam 140b, however, is intercepted by one of the 134 mirrors and is thereby projected downwardly and at an angle to one of the photo-cells of the 135b set. Beam 140c is intercepted by one of the 133 mirrors and is projected downwardly and at an angle to one of the photo-cells of the 135a set. Beam 140d is not intercepted by a mirror and again goes directly to one of the photo-cells of the 135 cells. The explanation need not be further extended but it will be appreciated that the arrangement shown provides for a compact grouping of the photo-cells, thereby conserving space.

It will be understood that when the photo-cells are receiving the images from the film, the film will be maintained in continuous motion. Upon certain combinations of code images being sensed by the photo-cell, film feed will be suspended and the shifting mirror shifted to the dotted line position, whereby a selected portion of the film may be seen at the viewing screen.

Framing of the image upon the screen is provided by the gate opening in the gate.

Hand set mechanism

Figures 1, 1A:
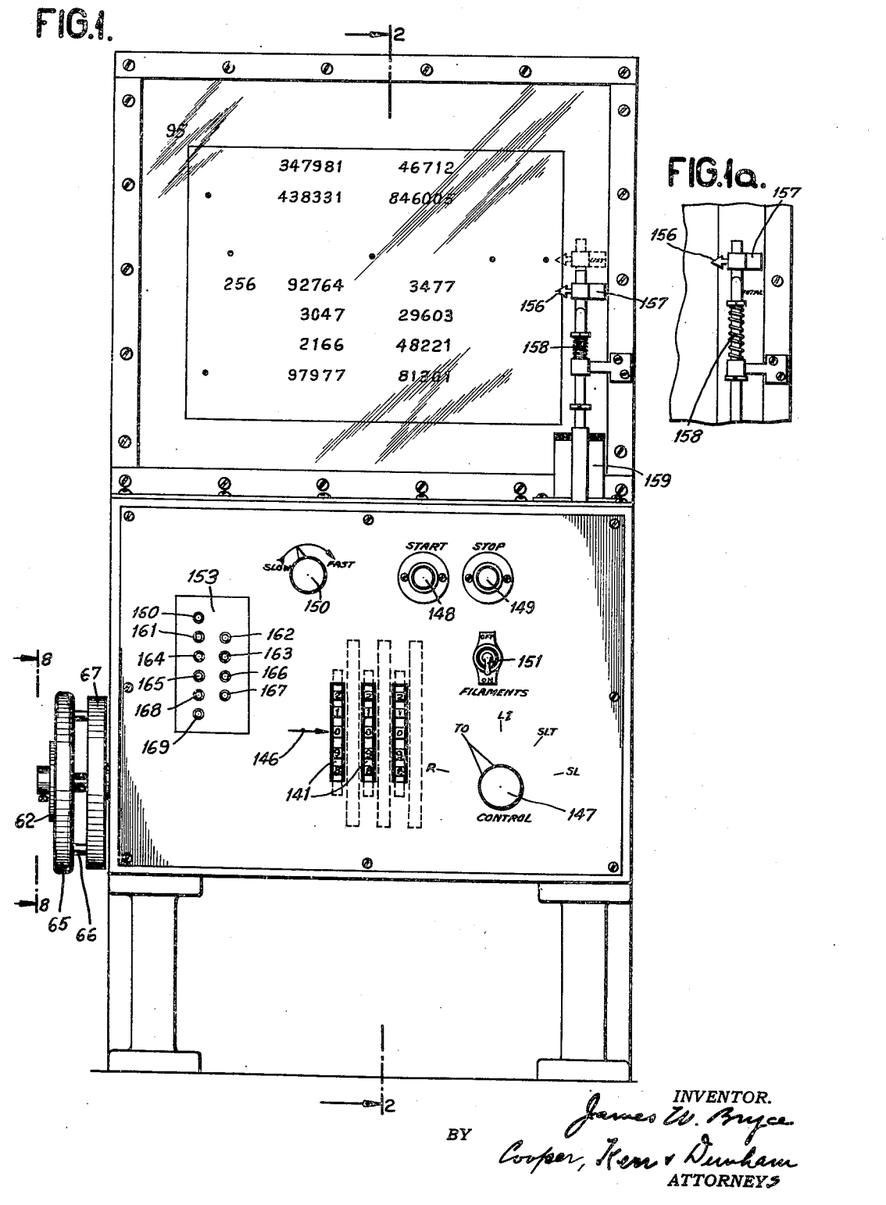
Figure 1 is a front elevational view of the machine.
Fig. 1a is a detail view of a portion of the mechanism of Fig. 1 with certain parts shown in displaced position.

For the purpose of selectively viewing certain film portions under control of the code spot identifications afforded by spots 130, there is provided a hand set-up mechanism which can be preset by hand for a particular group number or identification. This hand set mechanism comprises a series of knurled wheels 141 (see Fig. 2). Each knurled wheel has fixed to it a brush structure including a pair of electrically connected brushes 142. One brush contacts arcuate conducting segment 143, while the other brush of the pair contacts one of a series of individual segments 144. A detent spring 145 is provided to hold the knurled wheel in any selected position. As shown in Fig. 1, the various wheels are inscribed with suitable digits and the wheels may be turned to bring a particular desired set of digits in line with an index arrow 146. If it would be desired to set up a group number of 256, the various knurled wheels 141 would be so set that the left hand wheel would have the two digit opposite the arrow, the middle wheel would be turned to have the 5 wheel opposite the arrow and the right hand wheel would be turned to have the 6 wheel opposite the arrow.

Supplementary controls

The machine is provided with a selector switch generally designated 147 which can be placed in any of the five positions designated in Fig. 1. When switch 147 is set to position SL, the beginning of a selected list or section of data is arrested at a viewing position. When switch 147 is set at SLT, the total line of a selected data section is stopped in a viewing position. Thus, switch SL may be considered as part of supplementary selecting means to select which of different portions of a selected data section is to be stopped in viewing position. Start and stop buttons 148 and 149 are likewise provided. A slow and fast motor control knob 150 is likewise provided. There is also a filiment control switch generally designated 151. There is also provided a plugboard generally designated 153.

Referring to the portion of the machine adjacent the ground glass screen there is provided at this section of the machine a pointer 156. Pointer 156 may assume either of two positions. When the position is shown as in Fig. 1 a tail portion 157 of the pointer obscures the legend "Total" which is below the tail portion 157 and permits a "List" legend to be viewed. Likewise when the pointer is in the altered position (see Fig. 1a), the tail portion 157 obscures the "List" legend and permits viewing of the "Total" legend. The "List" and "Total" legends are disposed, if desired, directly upon the ground glass screen. The pointer 156 is spring urged in an upward direction by means of a spring 158 and may be considered to normally assume the position shown in Fig. 1a. When it is desired to shift it to the opposite position a solenoid 159 is energized drawing the pointer downwardly to the Fig. 1 position.

Figure 11:
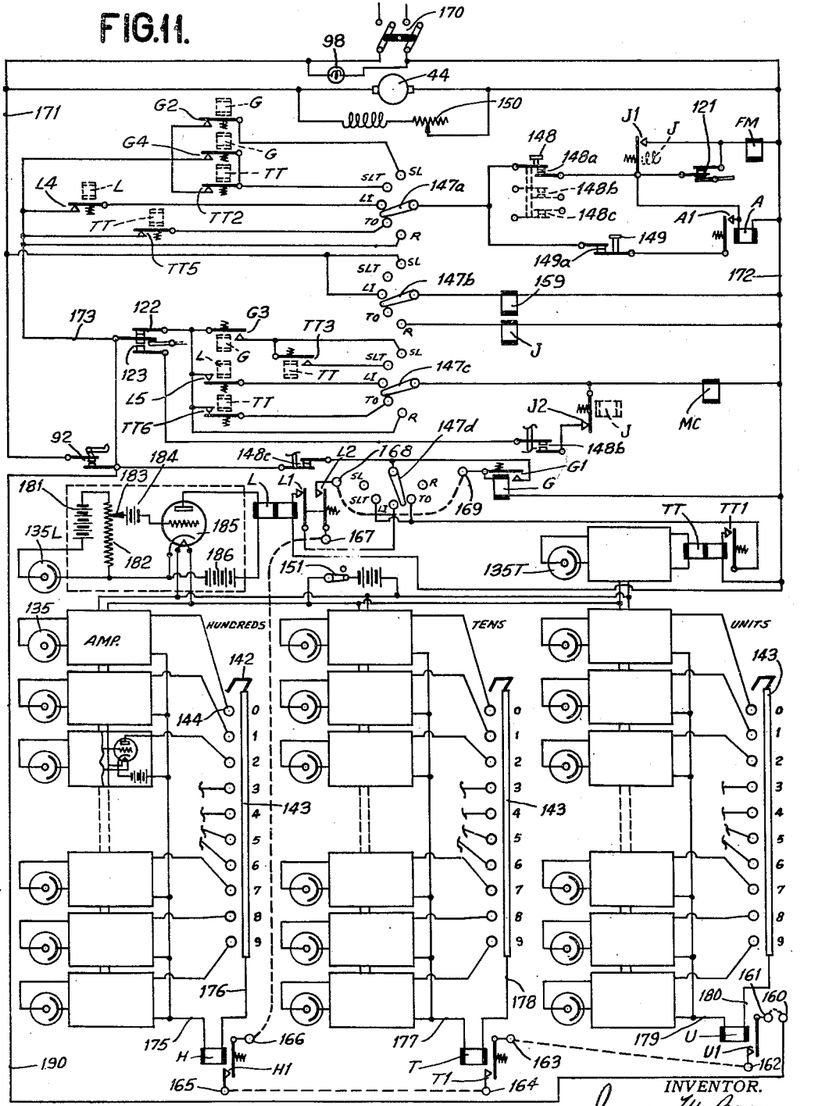
Fig. 11 is a view showing the circuit diagram of the machine.

It will be assumed that the machine has been loaded with a film, the film properly threaded through the gate and attached to the takeup reel. Let it be assumed that the operator desires to view a portion of the film pertaining to a particular group number, for example 256. For this type of operation, the hand setup devices 141 would be set to represent 256. The control device 147 would be set to bring the index to the position designated SL. Plug connections would be made at the plugboard 153 as follows: Referring to the circuit diagram (Fig. 11) plug connections would be made between 160 and 161, between 162 and 163, between 164 and 165, between 166 and 167 and between 168 and 169. The 147 control member would position the four switch arms to the SL position indicated on the wiring diagram. The arms in question may be designated 147a, 147b, 147c and 147d. The operator of the machine then closes main line switch 170 affording direct current supply to buses 171 and 172. Filament switch 151 will be closed. Switch 147b in the SL position provides current supply for solenoid 159 causing the pointer 156 to assume the position shown in Fig. 1. With the main line switch 170 closed, current supply is afforded to driving motor 44. The motor speed may be set at a desired spot by adjustment of the control rheostat 150. To initiate film feed, the start button 148 is depressed closing contacts 148a, 148b and opening contacts 148c. With the film in the machine, film contacts 92 are closed and a circuit is established from bus 171, through the 92 contacts, to a line 173, through relay contacts G2 in the position shown, through the SL switch arm 147a, through the 148a contacts now closed, through the 121 contacts now closed, to and through the feed clutch magnet FM. A further circuit is also completed to energize the A relay. Relay coil A upon energization establishes a stick circuit as follows: From line 172, through relay coil A, stick contacts A1, stop key contacts 149a, through switch arm 147a, and the SL switch terminal, through the G2 contacts and back to the other side of the line 171, through the path previously traced. With feed clutch magnet FM energized, film will be fed through the gate and as each line of film passes the gate images will be projected to the various photo-cells.

For convenience in describing the circuit diagram, it may be explained that the present machine includes thirty-two photo-cells. Photo-cell 135L is the photo-cell which is influenced by the control spot 132 (Fig. 10). Photo-cell 135T is the photo-cell which is influenced by the total control spot 131. All of the rest of the photo-cells which are designated 135 are influenced by the code spots 130. It will be further understood that there are a set of 135 cells which are influenced by the code spots 130 pertaining to the units order (see Fig. 10), another set influenced by the spots 130 pertaining to the tens order and another set of photo-cells pertaining to the code spots 130 pertaining to the hundreds order. When a code spot or control spot passes the opening in the gate the effect of the spot is to shut off flow of light to the related photo-cell. Each photo-cell has associated with it the customary amplifier unit. These on the wiring diagram are designated AMP. The individual wiring of one of these amplifier units will be subsequently described, but before describing the internal wiring, the external wiring connections will be explained. The plate output circuit of the amplifier unit associated with the 135L photo-cell is connected to a relay coil L. The plate output circuit of the amplifier unit influenced by photo-cell 135T is connected to a relay coil TT. Relays L and TT are double coil relays with a separate holding coil. The plate output circuits of the other amplifier units, viz. the ones influenced by the code spots 130 (Fig. 10) are individually connected to the segments of the hand setup device. The common or return side of these various amplifier units are in turn connected back to the common conducting strip through certain relay circuits as will now be described. For example, the common return circuit 175 pertaining to the amplifier unit for the hundreds order is connected to a relay coil H. The other side of this relay H is connected by a wire 176 to the common strip 143 of the hand setup device pertaining to the hundreds order. Similar circuit arrangements are provided for the units and tens orders, i. e. the main return circuit 177 connects through a relay coil T and thence by wire 178 to the strip 143 of the hand set device in the tens order. Another circuit 179 and 180 connects the common return circuit of the amplifiers pertaining to the units order to a relay coil U and back to the common strip 143 of the hand setup device in the units order.

Having described the external wiring connections of the various amplifier units, the internal wiring of one of these amplifier units will now be described. Considering the amplifier associated with and influenced by photo-cell 135L, photo-cell 135L is connected in series with a battery 181 and a resistor 182 provided with an adjustable tap 183 which in turn is connected in series with a grid biasing battery 184. The negative end of this battery is in turn connected to the grid of a vacuum tube 185. When maximum light is impinging on photo-cell 135L, i. e. a no spot condition, maximum current flows through resistor 182. This in turn causes maximum negative bias to be applied to the grid of tube 185. The plate circuit of tube 185 is in circuit with relay coil L and in circuit with a plate biasing battery 186. With maximum bias applied to the grid of the tube 185, minimum current will flow in the plate or output circuit and such minimum current will be insufficient to effectively energize relay coil L and close the relay contacts. If, however, on the other hand, a spot on the film shuts off light to the photo-cell 135L there will be maximum flow of current in the plate or output circuit so that relay coil L will be effectively energized. The spot which influences photo-cell 135L is the spot 132 (Fig. 10).

From the foregoing description, it will be appreciated that if a transverse line of code spots 130 match the set up of the hand setup device, there will be a concurrent energization of relay coils H, T and U. With the hand setup device set with an amount of 256 and assuming that code spots 130 representative of 256 are present and scanned at a film line, there will be flow of current from the amplifier influenced by the photo-cell which has its light blocked off by the spot representative of 2 in the hundreds order, whereupon relay H will be energized. Similarly, in the tens order, the code spot representative of 5 in the tens order will block light to the photo-cell whose amplifier unit is connected to the 5 segment spot of the hand setup device whereupon relay T will be energized. This energization is concurrent with the energization of relay H. Likewise in the units order the spot representative of 6 will block light flow to the photo-cell whose amplifier units is connected to the 6 segment spot of the hand setup device. This will cause energization of relay U concurrent with the energization of the other two relays.

With relays H and T concurrently energized in the foregoing manner, the feed of the film through the machine will be terminated. This control is provided as follows: When relay contacts U1, T1 and H1 are all closed, also with relay L energized, the relay contacts L2 (Fig. 10) are also closed. Accordingly, a circuit will be established, traced as follows: from left side of line 171, through the film lever contacts 92 now closed, via wire 190, through plug connection between 160 and 161, through the series circuit, through contacts U1, T1 and H1, through the plug connection from 166 to 167, through the L2 contacts now closed, through the plug connection from 168 to 169, to and through the relay coil G and back to the other side of the line. A holding circuit is provided for relay coil G through stick contacts G1, contacts 148c now closed and back to the other side of the line, through the film lever contacts 92. With relay coil G energized, contacts G2 open, breaking the holding circuit for relay coil A and clutch magnet FM. With clutch magnet FM de-energized, film feed stops with the selected portion of the film at the film gate. Closure of relay contacts G3 complete a circuit from line 171, film lever contacts 92, mirror contacts 122 in the position shown, through relay contacts G3, switch 147c in the SL position, mirror clutch magnet MC and back to line 172. Energization of the mirror clutch magnet MC will cause the mirror 97 to move to the dotted line position, whereupon the first part of the list on the film may be seen on the viewing screen 95 opposite pointer 156. Such a condition is illustrated in Fig. 1. The opening of the mirror contacts 122 which occurs upon full displacement of the mirror opens the circuit to the mirror clutch magnet MC. It has been explained how under this type of operation solenoid 159 is energized to cause the pointer 156 to assume the position of Fig. 1.

If the list pertaining to a particular group of data be too long to be entirely viewed on the viewing screen, it may be necessary to manually move the film through the gate so that the entire list may be viewed. This can be effected by manual feed of the film effected in the manner previously described. If such a manual displacement of the film has intervened before re-starting the machine the first line of the list should be re-lined with the pointer 156 before re-start of film feed is effected, otherwise there may be a second stoppage of film feed for the same group of data. After film feed has been stopped, film feed may be re-commenced by depressing the start button 148. With such an operation contacts 148a and 148b are closed and 148c are opened. Opening of contacts 148c deenergizes relay coil G by opening the holding circuit. With relay coil G de-energized, relay contacts G2 recloses so that relay coil A may be energized under the control of the start button contacts 148a. Closure of contacts 148b provide an energizing circuit for the mirror clutch magnet MC which circuit may be traced from line 171, through the film lever contacts 92, mirror contact 123 now closed, contacts 148b now closed, relay contacts J2 in the position shown, mirror clutch magnet MC and back to line 172. Energization of the mirror clutch magnet MC will restore the mirror 97 to the full line position and close contacts 121. Closure of these contacts 121 places the feed clutch magnet FM in parallel with relay coil A and energization of the feed clutch magnet FM causes a new film feeding operation to start. The circuit which has just been described for energizing the mirror clutch magnet MC is interrupted as soon as the mirror returns to full line position by the opening of contacts 123.

Selected total operation

Another type of selecting operation is one where it is desired to stop and view a section of the film for a total pertaining to a selected list or selected group number. For this type of operation control switch 147 (Fig. 1) will be set at the SLT position. Switch arms 147a, 147b, 147c and 147d will be on the SLT switch terminals. With switch arms 147b on the SLT terminal solenoid 159 will not be energized. Accordingly, the pointer 156 will assume the position shown in Fig. 1a. Upon depressing the start button 148 a circuit is completed from line 171, through the film lever contacts 92 now in closed position, through relay contacts G4 now closed and TT2 now closed, to terminal SLT, through switch arm 147a, start button contacts 148a, relay coil A and film clutch magnet FM which are in parallel. With FM energized, film feed commences and film feeds through the machine until there is again an agreement between the code spots 130 and the set up of the hand setup device. When such agreement is ascertained there is again an energization of relay coil G. Under this type of operation film feed should not stop with the pointer in line with the top of the list, but film feed should be allowed to continue until the pointer 156 aligns with the total data on the film. Film feed will continue because the holding circuit for film clutch magnet FM is maintained through the TT2 contacts even though the G4 contacts are now opened. When spot 131 passes the film gate it influences its related photo-cell 135T whereupon relay coil TT is energized. This relay is maintained energized through the holding coil of the relay and holding contacts TT1. The holding circuit is traced as follows: from line 172, through the holding coil, the TT1 contacts, through terminal SLT, switch arm 147d, back through the 148c contacts now closed, the film lever contacts 92 and back to the other side of the line 171. With relay TT energized, relay contacts TT2 open, whereupon the holding circuit for the feed clutch magnet FM is interrupted. Film feed will then terminate with spot 131 in a position for alignment with the pointer 156 on the viewing screen. The mirror clutch magnet MC is also energized, the circuit for energizing it in this instance being from line 171, through the film lever contacts 92, through the 122 contacts, through relay contacts G3 now closed, through the TT3 relay contacts, to terminal SLT, through the 147 switch arm, through the mirror clutch magnet MC and back to line 172. The mirror 97 will again be displaced to dotted line position and the list or total line of the selected group will be in reading position and projected on to the ground glass screen opposite pointer 156.

After the foregoing operation, film feed may be resumed by re-depressing the start button 148 which close contacts 148a and 148b and opens contacts 148c. Opening of contacts 148c de-energizes relay coil G and relay coil TT by breaking the hold circuit for both of these relays. The holding circuit for relay coil TT is through switch arm 147d in the SLT position. Closure of contacts 148b re-energizes the mirror clutch magnet MC whereupon the mirror is restored in the manner previously explained.

*Beginning of list control*

Under certain conditions and with certain types of records, it may be desired to stop film feed at the beginning of every list. Under such conditions the hand set-up device for a group number is not utilized. Control of film feed under this condition is afforded solely by control spot 132. For this type of run control switch 147 (Fig. 1) is thrown to the LI position. Switch arm 147b will contact switch terminal LI and energize the pointer controlling solenoid 159. With this type of run the machine is started in the usual way and the energizing and holding circuits for clutch magnet FM and relay coil A now extend through switch arm 147a and switch terminal LI, back through relay contacts L4, line 173 and film lever contacts 92 to line 171. When a spot 132 is scanned which will occur at the head of each group of data, the relay coil L will be energized and upon energization contacts LI will close, energizing the holding coil of this relay. The holding circuit extends from line 172, through the LI contacts, to the LI terminal, through switch arm 147d, through contacts 148c, film lever contacts 92, back to line 171. With relay coil L energized, relay contacts L4 open to de-energize feed clutch magnet FM and relay coil A. With L energized, relay contacts L5 close and provide an energizing circuit for the mirror clutch magnet MC, through switch arm 147c, which stands on the LI terminal. The mirror will be displaced in the manner previously described so that the list can be viewed. With this type of run the machine will stop its film feed with the first line of each group of film data in viewing position.

Resumption of film feed may be effected in the manner previously explained for other types of run.

*Stop at every total*

In the event that it is desired to stop film feed at every total, irrespective of the group number control from the hand setup device, the control switch 147 (Fig. 1) is thrown to the TO position. Swith arms 147a, 147b, 147c and 147d will then all be on the TO terminals. With this type of run every time a total spot 131 passes the film gate, photo-cell 135T will be influenced and relay coil TT will be energized. With TT energized, its holding circuit through TT1 will be closed, this holding circuit extending back to left side of line through 147d, which is now on the TO terminal and through the circuit path previously traced. Energization of relay coil TT will cause the TT5 contacts to be opened. This will interrupt the holding circuit for feed clutch magnet FM and relay coil A, such holding circuit extending through switch arm 147a now in the TO terminal position. Film feed will stop with the 131 total spot in alignment with pointer 156 (see Fig. 1a). With this type of run, solenoid 159 will not be energized since switch arm 147b is on the TO terminal. With this type of run the mirror clutch magnet MC is energized through a circuit which extends through 147c, terminal TO, relay contacts TT6 now closed, through mirror contacts 122, film lever contacts 92 and back to line 171. The mirror will again be displaced and the total line section of the film may be viewed. After this type of run the machine can be restarted in the usual way by depressing the start button 148.

*Continuous run*

If it is desired to run the film continuously through the machine without any stoppage of film feed at all the control switch 147 can be displaced to the run position designated R. Switch arms 147a, 147b, 147c and 147d then all stand on the R terminal. With switch arm 147b on the R terminal, an energizing circuit is provided for relay coil J. With relay coil J energized, contacts J1 are closed. With switch arm 147a on the R terminal, the depression of start button 148 will energize the feed clutch magnet FM and relay coil A. Film feed will then continue without interruption. With this type of run it is desirable to have the mirror 97 maintained in the up position. Assuming the mirror up at the beginning of a run with relay coil J energized, contacts J2 will open to interrupt the circuit to the mirror clutch magnet MC which would otherwise be established through the start key control parts 148b. If the mirror should happen to be down at the beginning of the run it should be brought to upper position and this is provided for by a circuit which extends through switch arm 147c now on the R terminal, the circuit being completed back to left side of line through the 122 contacts now closed, through the film lever contacts 92 and back to left side of line. This will provide for energization of the mirror clutch magnet MC for the mirror down at the beginning of a run. For this type of run it should be mentioned that the start key 148 should not be depressed until the mirror has had time to swing up to up position. With this type of run the film will continue to be fed until the stop key 149 is depressed or until the supply of film is exhausted. When film supply is exhausted the film lever contacts 92 open and when these contacts open film feed clutch magnet FM and relay coil A will be de-energized.

What is claimed is:
1. A film selecting and viewing machine, including in combination, film feeding means for feeding a film bearing a line or lines of data designations pertaining to different groups, said film also having a plurality of codal data mark designations disposed transversely across the film, which plurality of marks by their relative lateral position with respect to each other and to the film, denote a multi-denominational code number which distinctively designates each group, said first mentioned data designation being in columnar alignment with the code marks, means including a plurality of elements for concurrently scanning the plurality of transversely disposed code marks which designate a group while the film is in motion, distinguishing means to distinguish scanned data designations from scanned code marks, means to set up data for comparison with codal data, means controlled by the scanning means and said setup means and under further control of the distinguishing means for interrupting film feeding movement upon a group of said elements concurrently scanning a plurality of code marks designating a group number corresponding to the set up data and irrespective of the scanning of preceding code marks, and viewing devices which are effective upon stoppage of film feed.

2. A machine according to claim 1 wherein operator actuated selecting means are provided which operate in cooperation with supplemental control marks upon the film to selectively bring about stoppage of film feed at the beginning or end of a group, said stoppage of film feed being further effected under the conjoint control of the scanning means upon the scanning of code marks denoting a single group.

3. A machine according to claim 1 wherein power driving means is provided for the film feeding means affording continuous feed of the film, manual driven means for advancing or retracting the film, and clutch means for disconnecting the power driving means from the film feeding means to enable the manual means to be manipulated by the operator for advancing or retracting the film to any desired extent.

4. A film selecting and viewing machine including in combination, film feeding means for feeding a film, said film having a line or lines of data designations thereon pertaining to different groups, said film also having codal data marks thereon for distinctively designating each group of data and also having a pair of supplemental marks thereon to designate the beginning and end of a group, devices for suspending film feed, means to scan the film and detect the codal and supplemental marks thereon, means to set up a comparison number, comparing means controlled by the scanning means which scans the code marks and a supplemental mark and by said set-up means for determining matching of code marks and the set up number and for controlling the film feed suspending means to suspend film feed at the beginning of a group, and supplemental control devices set up under control of the scanning means upon scanning the other mark for modifying film feed suspension by the foregoing means and causing film feed suspension at the end of the group.

5. A film selecting and viewing machine, having film handling devices for advancing a film and stopping its movement so that a selected section may be viewed at a viewing station and including in combination, means including a plurality of photocell elements for concurrently scanning a set of codal marks upon the film, which codal marks are disposed between other data upon the film, which other data may be of indeterminate length, said codal marks being representative of a following group of other data and said film also having supplemental control marks thereon, means to scan and detect the supplemental control marks, manually manipulable devices adapted to be set by the operator, selectively set control devices controlled by the photocell elements of the scanning means upon the concurrent scanning of a set of the codal marks at the beginning of a group and by the manual manipulable devices and by the scanning and detecting means for the supplemental marks upon the film for selectively stopping film feed at the beginning of a group or at the end of a group so that either section of the film pertaining to a common group may be viewed.

6. In a film viewing machine for viewing any of successive data sections of a film, each section bearing a codal designation distinctively identifying the section; the combination of mechanism for feeding the film, optical, photocell scanning devices to scan the film while in motion for individual section identifying designations, selecting means for selecting only a desired one of the section identifying designations for control purposes, section selecting means cooperating with the designation selecting means and with the scanning devices upon their scanning the selected section identifying designation and irrespective of the scanning of preceding designations to select one of the data sections to be viewed, supplemental means for selecting which of different portions of the selected data section is to be stopped in a viewing position, and means conjointly controlled by the section selecting means and by the supplemental selecting means for interrupting operation of the feeding means when the selected portion of the selected data section is in viewing position.

7. In a film viewing machine for viewing a film having successive data sections in each of which an identification, comprising code spots in columnar alignment with data representations and in addition a supplemental spot out of such columnar alignment, is provided; the combination of mechanism to feed the film, means for scanning the film while in motion for the code spots and the supplemental spot of the identifications, means settable to select an identification to control stoppage of film feed with the data section identified thereby in a viewing position, control means operated by the scanning means in conjunction with the settable means upon the scanning means sensing the code spots of the selected identification, other control means operated by the scanning means upon sensing the supplemental spot of the identification, and means operated by both said control means for causing film feed to be interrupted with the section bearing the selected identification in a viewing position.

8. A film selecting and viewing machine, including film feeding means for passing successive sections of a film past a common illuminating station, illuminating means at such station, photocell means to detect combinations of code marks upon the film, means controlled by the photo-cell means for controlling suspension of film feed, a viewing screen, a mirror system including a mirror which in one position permits light from the illuminated film at the station to pass directly to the photocell means and which in another position interrupts light passage to the photocell means and causes the image of the illuminated film at the station to be thrown on the viewing screen, and means controlled by said photocell means upon suspension of film feed for causing shifting of said mirror from the first mentioned position to the last mentioned position.

9. A film handling machine comprising film projecting means for projecting film areas, feeding means to feed a film across said projecting means, said film having recorded thereon sections of one or more lines of data indications, said film also having in each section a codal designation in the form of a combination of code markings in index positions disposed transversely across the film and whereby the codal designation of a section in and of itself and irrespective of other codal designations codally represents a distinctive identification for its own section, scanning means for simultaneously scanning the index positions of a section for code markings while the film is in motion and including means coacting with a portion of each codal designation to distinguish between the codal designations and the data indications, film feed control means, and variably settable means for placing the feed control means under the individual control of a pre-selected codal designation acting through the scanning means and upon the scanning thereby of the selected desigation irrespective of the scanning of any preceding designations, said variably settable means having optional settings corresponding to different codal designations to enable any of different codal designations to be placed in individual and independent control of the feed control means.

10. In a machine including in combination, feeding means for a film bearing group of data designations and also codal designations pertaining to the different groups, each codal designation having codal characteristics in and of themselves codally designating a related group and disposed in columnar alignment with data designations, all of said codal designations having a common characteristic distinguishing them from the data designations, optical means to scan the film in motion including the columns of the film commonly bearing the data designations and said codal characteristics and including photocell means solely responsive to codal designations including said common characteristic, a film feed control circuit, relay means to control the circuit and group pre-selecting means for placing the relay means under the individual control of a pre-selected codal designation acting through the scanning means and upon response of the photocell means thereof to the pre-selected codal designation irrespective of the scanning of any preceding codal or data designations.

11. In a machine as set forth in claim 10, wherein the film also bears a supplemental designation and wherein the scanning means includes photocell means responsive to said supplemental designation and including a supplemental relay controlled thereby, dual means for controlling the film feed control circuit, said means including said supplemental relay and said first mentioned relay and manual means for rendering said supplemental relay effective with the first mentioned relay for conjoint control of the film feed control circuit.

12. A film handling machine comprising film projecting means for projecting film areas, feeding means to feed a film across said projecting means, said film having recorded thereon sections of one or more lines of conventional characters, said film also having in each section a codal designation in the form of a combination of code markings in index positions in columnar alignment with recorded characters and disposed transversely across the film and whereby the codal designation of a section in and of itself and irrespective of other codal designations codally represents a distinctive identification for its own section, said designations having a common distinguishing characteristic for distinguishng them from the recorded characters, optical scanning means for simultaneously scanning the index positions of a section for code markings while the film is in motion and including means co-acting with the common distinguishing characteristic of each codal designation to distinguish between the codal designations and the recorded characters, film feed control means, and variably settable means for placing the feed control means under the individual control of a pre-selected codal designation acting through the scanning means and upon the scanning thereby of the selected designation irrespective of the scanning of any preceding designations, said variably settable means having optional settings corresponding to different codal designations to enable any of different codal designations to be placed in individual and independent control of the feed control means.

JAMES W. BRYCE.